Figure 1:
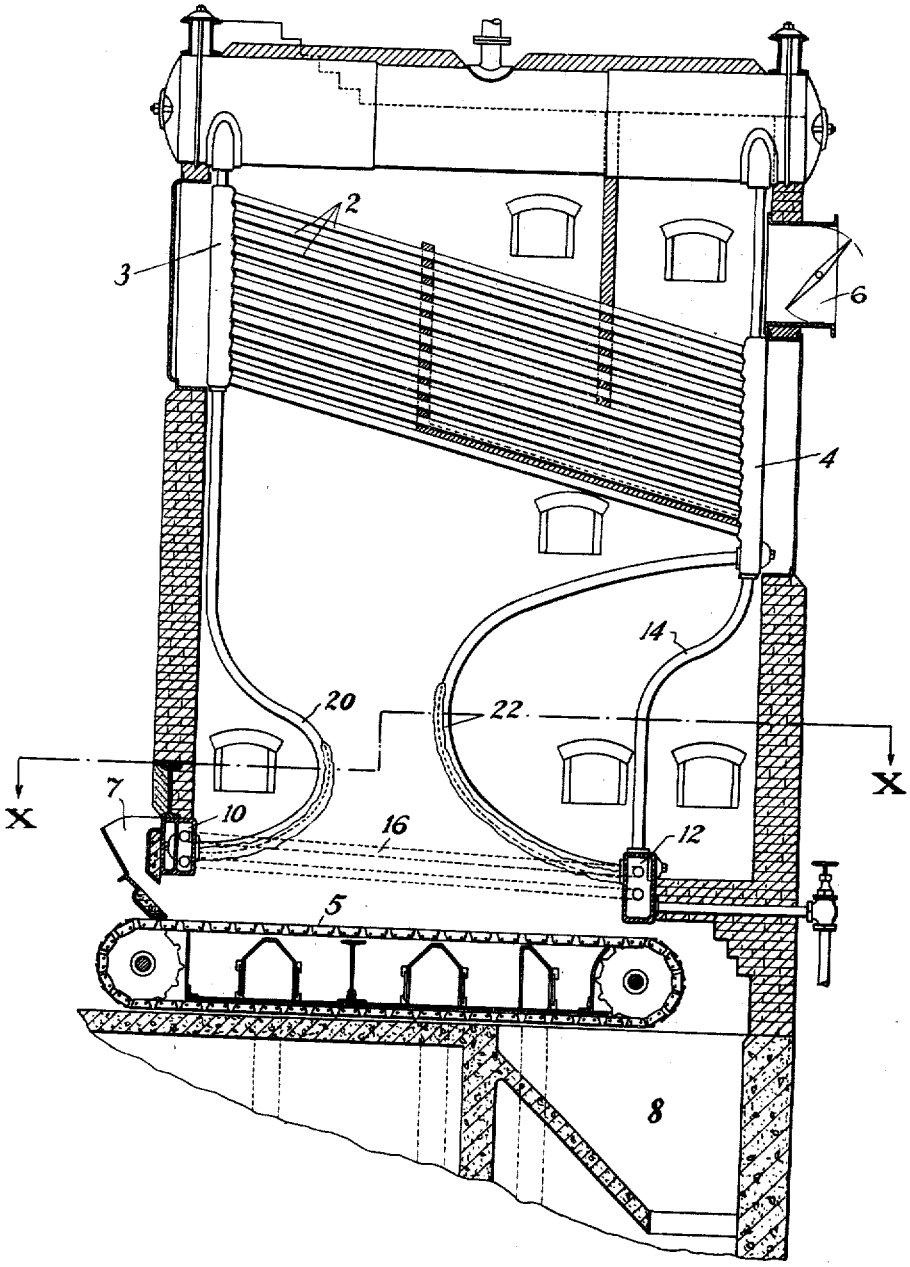

Jan. 12, 1932. E. G. BAILEY Re. 18,326

REFRACTORY ARCH FOR FURNACES AND METHOD OF PRODUCING THE SAME

Original Filed Jan. 17, 1922 2 Sheets-Sheet 1

INVENTOR
Ervin G. Bailey
BY Benj. R. Newcomb
ATTORNEY

Jan. 12, 1932. E. G. BAILEY Re. 18,326

REFRACTORY ARCH FOR FURNACES AND METHOD OF PRODUCING THE SAME

Original Filed Jan. 17, 1922 2 Sheets-Sheet 2

INVENTOR
Ervin G. Bailey
BY Benj. R. Newcomb
ATTORNEY

Reissued Jan. 12, 1932 Re. 18,326

UNITED STATES PATENT OFFICE

ERVIN G. BAILEY, OF EASTON, PENNSYLVANIA, ASSIGNOR TO FULLER LEHIGH COMPANY, A CORPORATION OF DELAWARE

REFRACTORY ARCH FOR FURNACES AND METHOD OF PRODUCING THE SAME

Original No. 1,719,416, dated July 2, 1929, Serial No. 529,846, filed January 17, 1922. Application for reissue filed November 1, 1930. Serial No. 492,854.

The invention here disclosed is concerned with furnaces and boilers. It presents a novel furnace wall and methods of forming and maintaining that wall, spontaneously effected within a coal burning furnace during its operation. It presents, too, a novel method of controlling furnace temperatures.

This invention relates to a refractory arch or deflecting wall for furnaces, the object being to produce an effective refractory arch at much less cost than that of the arches heretofore used for like purposes, said arch having other advantages than economy of production which will be readily recognized.

In some types of furnace it is necessary for effective operation that there should be refractory arches to reflect the heat, and thus to intensify the heat at the fuel bed in order to ignite the coal effectively and properly to maintain the ignition.

Such arches as heretofore made have been located in a more or less inclined position above the fuel bed, and have commonly been made of refractory masonry which becomes highly heated and radiates or reflects the heat back upon the fuel bed, but the material of which such arches have been made has but little durability, so that after a relatively short period of service the arches have to be renewed at considerable expense.

It has also been found that in the operation of certain types of boilers having water tubes extending over the top of the combustion chamber and across the path of the gases and products of combustion, there is an accumulation of solid refractory material upon the tubes, which comes from the ash or solid residue carried with the gases and in some cases will build thick coatings of material upon the tubes, thus checking the draft and in time involving a stoppage of the service of the boiler until such accumulation can be removed.

I have discovered a method by which the deposit of material from the gases instead of being detrimental and causing costly delays and expenditure of labor for its removal, may be made serviceable, and in accordance with the present invention, I provide in the combustion chamber a series of water circulating tubes substantially parallel to one another and extending from the side or end walls of the combustion chamber in the direction required for a refractory arch.

Then when the furnace is set in operation the products of combustion flowing along these tubes will deposit thereon a coating of refractory material which will quickly accumulate and fill the spaces between the tubes so that the coatings on the several tubes will merge into a continuous layer which will become of proper thickness to have the portion facing the fuel bed become highly heated or incandescent so as to perform the usual function of a refractory arch in maintaining sufficiently high temperature at the fuel bed to promote the ignition of the fuel.

The deposit and the rapidity with which it accumulates varies with coal of different characters and it may be necessary in some cases to use coal of a desired character for a sufficient period to cause the refractory part of the arch to be formed, after which other fuels may be used, or it may in some cases be necessary from time to time to introduce with the coal certain materials of a greater or less fluxing nature in order to control the character and thickness of the deposit on the tubes.

The arch here disclosed and shown in Fig. 1 of the accompanying drawings has at its upper portion upright walls with opposing refractory layers regulated as to thickness, spontaneously formed and continuously renewed by the deposit of fused and semi-fused solids from suspension in the moving furnace gases. In the operation of the furnace slight variations in temperature cause parts of such deposits to fall from the wall, such loss being compensated by the deposit of more solids when the wall temperature next drops sufficiently to effect solidification. There is thus a substantially continuous interchange of particles effecting a continuous renewal of the inner layer of the wall.

Figure 2:
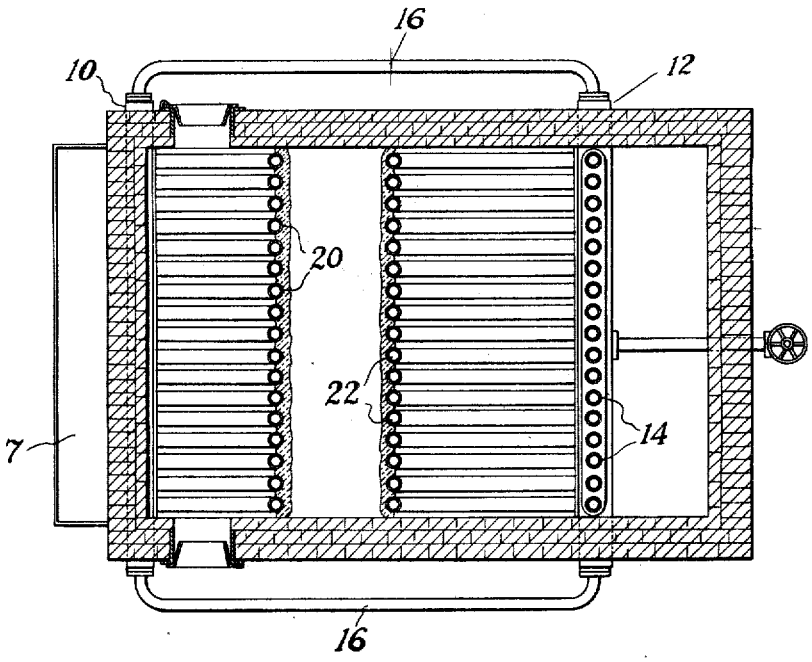

Fig. 1 shows in longitudinal section a boiler furnace provided with arches which embody the construction, and have been produced by the method, forming the subject of this invention and Fig. 2 is a horizontal section of the same on line X—X Fig. 1.

The boiler proper may be of any suitable or usual construction, it being shown in this instance as comprising a number of water tubes 2 extending from front to rear legs or headers 3, 4, said tubes being in the upper part of the combustion chamber so that the products of combustion rising from the fuel bed on the grate 5 flow through the spaces between said tubes on their way to the uptake 6.

The grate 5 may also be of usual construction, being herein shown as a chain grate upon one end of which the fuel is supplied through a feed chute 7, the fuel being carried along upon the upper stretch of the grate, and the ash being discharged over the rear end of the grate into an ash pit at 8.

It is necessary for efficient operation that a high temperature should be maintained at the end of the grate upon which the fuel is delivered from the chute 7, in order to effect the proper ignition of the fuel as it enters the combustion chamber and for this purpose it has been customary to build refractory arches in the fire box usually inclining rearward and upward from the front wall of the fire box just above the point of introduction of the fuel, or forward and upward from the rear wall, or both.

In accordance with the present invention, the front and rear water legs 3, 4 of the boiler proper are connected with water boxes or manifolds 10, 12 near the front and rear ends of the lower part of the combustion chamber, the said rear water box 12 being connected with the rear legs 4 by a number of pipes 14 through which the cooler water descends in the circulatory movement.

The said rear water box 12 is connected as shown in this instance with the front water box 10 by pipes 16 on the outside of the furnace walls.

Said front water box 10 is connected by a series of tubes 20 with the front water legs 3, the said tubes being parallel and quite close together and being inclined rearward and upward from their point of connection with the front water box 10 so that they occupy the position in the fire box desired for a refractory arch to co-operate with the fuel especially near the end at which the fuel is introduced.

From such arch forming part the said tubes extend forwardly and then upwardly to the front water leg 3 and the relation of the several water passages to the furnace is such that the circulation will be downward through the pipes 14 and upward through the tubes 20.

As shown in this instance another series of arch forming tubes 22 extend from the rear water box 12 to the rear water legs 4, said tubes 22 being more exposed to the heat than the pipes 14 so that an upward circulation will be maintained through the said tubes 22.

These sets of tubes 20, 22 with suitable circulating connections are all that is required in the erection of the apparatus for the production of the arches, which for the rest are produced automatically by the operation of the furnace itself.

The products of combustion rising from the fire carry more or less ash and solid material which upon encountering the sets of tubes 20, 22 will adhere thereto, and as the action continues the material will accumulate until the accumulation on each tube reaches and merges into the accumulation on the next tube, thus forming a continuous layer which will increase in thickness until there is a sufficient body between the relatively cool tubes and the portion exposed to the fire to cause the latter portion to become highly heated and practically incandescent, so as to produce the desired effect of promoting the ignition of the fuel as it enters, and maintaining the ignition in the fuel bed.

The character of the refractory coating or layer and the time required for its production will vary somewhat with different kinds of fuel and in some cases it may be necessary to add clay or some other fluxing material, such for example as lime or lime and silica, to the fuel for a time in order to hasten the deposit of the material of the arch.

In some cases it may be necessary at the outset to coat the tubes with a lime wash or some other suitable substance which will insure a more prompt deposit and firmer adherence to the tubes of the solid deposit from the products of combustion.

In case the coal being used has an ash with a low fusing temperature there will be a tendency of the accumulated coating to fuse and flow away, making the material of the arch too thin. In such case it may be desirable to introduce a less fusible material, such for example as fire clay, fragments of fire brick, or alumina, with the coal until the material of the arch accumulates to a sufficient thickness.

On the other hand, if the refractory layer has an excessively high fusing temperature, it might build to an excessive thickness thus diminishing the space for the passage of the products of combustion to too great an extent. In such event a material fluxing at a lower temperature, such for example as ordinary sand or lime, may be introduced from time to time with the fuel.

It is obvious that the form and location of the arches may be varied as desired and will naturally be varied according to the judgment of the constructor to meet the requirements of various types of furnaces.

As the products of combustion do not have to pass through the spaces between the arch tubes 20 or 22, said tubes may be located as near together as is found desirable, and with close spacing the coatings starting on the individual tubes will very soon merge into a continuous layer practically interlocked with the tubes and securely supported thereby.

What I claim is:

1. That improvement in the art or method of making refractory arches for furnaces which consists in installing a series of water circulating tubes in the location desired for the arch, and causing to be deposited thereon a layer of refractory material derived from the solid residue carried by the gaseous products of combustion from the fire.

2. That improvement in the art or method of making refractory arches for furnaces which consists in installing a series of parallel closely spaced water circulating tubes in the location desired for the arch and causing a layer of refractory material to be deposited thereon from the gaseous products of combustion of the fuel and introducing a fluxing material with the fuel to modify and control the deposit on the tubes.

3. The combination with the boiler and furnace of a steam generator, of a refractory deflecting wall composed of a number of closely spaced parallel water circulating tubes located over the fire bed, and a continuous layer of refractory material adhering to and covering said tubes and filling the spaces between them, said material being refractory and of the same character as refractory products that are deposited from products of combustion during the operation of said furnace, said material lying for the most part on the side of the plane of said tubes toward the combustion space.

4. A method of constructing and operating a steam boiler having a furnace wall presenting a bank of fluid circulating tubes in the path of moving products of combustion, comprising the burning of slag producing coal in such a manner that the combustion gases carry past said tubes incandescent fused or semi-fused solids, circulating fluid through the tubes to cause them to remain at a temperature lower than that of the solids so that the solids gather on the tubes and accumulate to form a refractory furnace wall supported by the tubes and continuously renewed by such deposition as the combustion continues.

5. In combination, a boiler, a coal burning furnace, a row of upright relatively cool water tubes connected into the boiler circulation and constituting a part of a furnace wall, a firing means producing molten ash and solid material to be carried in suspension as parts of the moving products of combustion, means on the tubes for promoting a prompt deposit and firmly adherent accumulation of such ash or solids on each tube until the accumulation on each tube reaches and merges into the accumulation on the next tube, thus forming a continuous layer which increases in thickness until there is a sufficient body between the relatively cool tubes and the burning fuel to cause the latter portion to become highly heated and practically incandescent so as to promote the ignition of the fuel as it enters the furnace and to control furnace temperature.

6. In combination, a boiler, a furnace, upright relatively cool water tubes connected into the boiler circulation so as to be maintained thereby at a constant temperature and constituting a part of a furnace wall, a firing means producing molten ash and solid material to be carried in suspension by the products of combustion, a material coating on each of the tubes for promoting a firmly adherent accumulation of such ash or solids on each tube until the accumulation on each tube reaches and merges into the accumulation on the next tube, thus forming a continuous layer which will increase in thickness until there is a sufficient body between the relatively cool tubes and the burning fuel to cause the latter portion to become highly heated and practically incandescent so as to promote the ignition of the fuel as it enters the furnace.

7. In the art of constructing furnaces, the method of forming a furnace wall, comprising the following steps: erecting a plurality of water tubes in parallel relation and in row arrangement in such a position that the products of combustion impinge directly against the tubes; circulating hot water through the tubes, burning a slag producing fuel so that the products of that combustion will hold in suspension fused or semi-fused bodies moving in the combustion currents against said tubes, maintaining such relative temperatures that some of said bodies will accumulate and solidify to form primary refractory covers for the tubes, continuing said circulation and burning until said primary cover is at a temperature low enough to cause a secondary deposit of similar character but extending as a complete refractory wall over the entire row of tubes, and further causing the circulation and combustion to renew the refractory wall, thus regulating the wall and limiting its thickness.

8. That improvement in the art or method of making a refractory deflecting wall for furnaces, which consists in installing a row of parallel, closely-spaced water circulating tubes in the location desired for the wall, introducing into the furnace a fuel which produces a slag fusing at such a low temperature that it tends to flow away from the tubes and simultaneously introducing a non-combustible non-metallic material fusible at the temperature of the combustion space of the furnace to raise the fusing temperature of the combined slag material, and causing said combined material to be deposited on the tubes from the gaseous products of combustion of the fuel while circulating fluid through the tubes to maintain them at a temperature below the melting point of said material.

9. The combination with the boiler and furnace of a steam generator, of a deflecting wall composed of a number of closely spaced, vertically extending, parallel water circulating tubes with the metal of each tube out of contact with the metal of its adjacent tubes, and a continuous, jointless layer of fused slag-like refractory material adhering to and covering said tubes and filling the spaces between them and supported by the tubes only, said material lying for the most part on the side of the plane of said tubes toward the combustion space.

10. The combination with the boiler and furnace of a steam generator; of a deflecting wall composed of a number of closely spaced, vertically extending, parallel water circulating tubes, with the metal of each tube out of contact with the metal of its adjacent tubes; and a continuous, jointless layer of used slag-like refractory material adhering to and covering said tubes and filling the spaces between them and supported by the tubes only; said material extending along the tubes for only a part of the lengths thereof and lying for the most part on the side of the plane of said tubes toward the combustion space.

ERVIN G. BAILEY.

CERTIFICATE OF CORRECTION.

Reissue Patent No. 18,326. Granted January 12, 1932, to

ERVIN G. BAILEY.

It is hereby certified that error appears in the printed specification of the above numbered patent requiring correction as follows: Page 4, line 25, claim 10, for "used" read fused; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.